G. H. RICH.
Grain Separator.

No. 90,306.

Patented May 18, 1869.

Witnesses
Wm. H. Howell
W. E. Mans-

Inventor
G. H. Rich.

United States Patent Office.

GEORGE H. RICH, OF GENEVA, ILLINOIS.

Letters Patent No. 90,306, dated May 18, 1869.

---

IMPROVEMENT IN MACHINE FOR SEPARATING COCKLE FROM WHEAT.

---

The Schedule referred to in these Letters Patent and making part of the same.

---

*To all whom it may concern:*

Be it known that I, GEORGE H. RICH, of Geneva, in the county of Kane, and State of Illinois, have invented a new and useful Improvement in Machines for Separating Cockle and other Small Seeds from Wheat; and I do hereby declare and make known that the following is a full, clear, and exact description of the same, reference being had to the accompanying drawings, and the letters and figures marked thereon, which form part of this specification.

My said invention consists in a novel arrangement or construction in machines for separating cockle and other small seeds, or other seeds smaller than the grains of wheat, from wheat; and to enable those skilled in the art to understand how to construct and use my said invention, I will proceed to describe the same with particularity, making reference, in so doing, to the aforesaid drawings, in which—

Similar letters of reference in the several figures indicate the same parts of my said improvement.

A represents a suitable enclosing-frame, or case, in which is arranged a horizontal roller, or cylinder, C, supported upon spindles at each end, in suitable bearings in the ends of the enclosure A.

The convex surface of said cylinder is provided with numerous small cells, marked $c$, whose depth and size are sufficient to enable a cockle-seed, or other seeds of a less size than wheat-kernels, to lie wholly within said cells, but which are so small that a wheat-kernel can only enter one of said cells endwise, leaving the other end of the kernel of wheat projecting up, or out from the surface of the cylinder.

Directly over said cylinder C is a smaller roller, B, provided with numerous brush-tufts, $b$, as shown, said brush-roller being connected with the cylinder C, by means of a belt, H, or other suitable gearing, in such a manner that the revolution of the cylinder C, by means of a handle, or crank, G, or otherwise, imparts a rotary movement to the brush-roller, in the reverse direction, said brushes $b$ moving closely in contact with the upper part of the cylinder.

Figure 1:
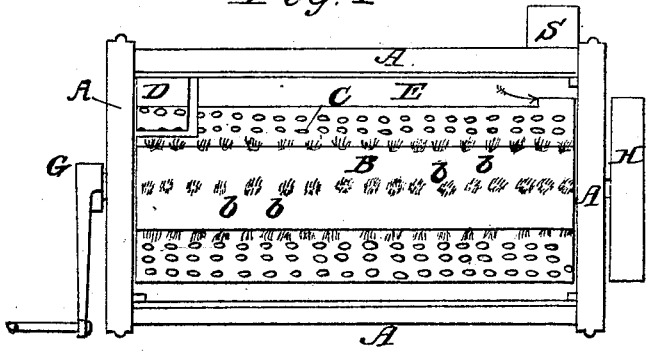
Figure 1 represents a plan or top view of my invention.
Figure 2:
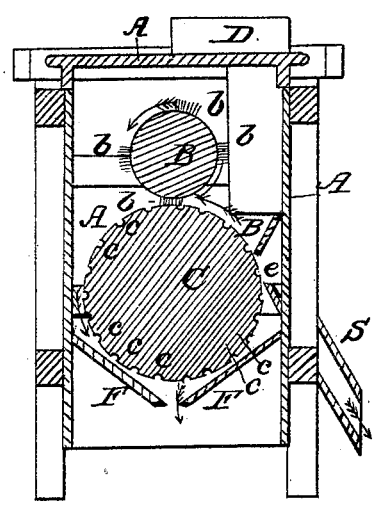
Figure 2 is a transverse sectional view of the same.
Figure 3:
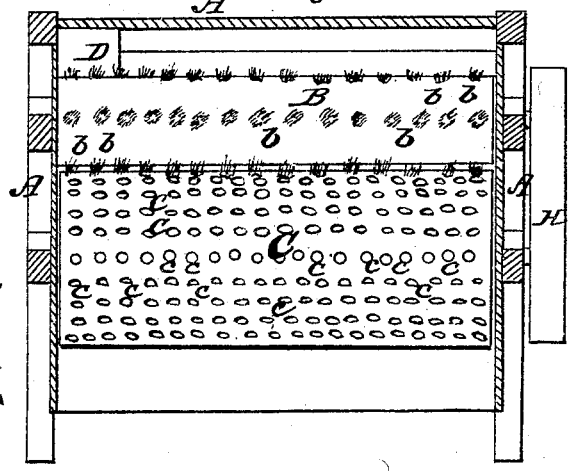
Figure 3 is a side view thereof, the box, or casing being in section.

Upon one side of said cylinder C, an inclined board, extending from one end of the roller to the other, slopes down from the side of the casing to the cylinder, forming a trough between the cylinder and said inclined board F, as clearly shown in fig. 2, along which the grain passes from one end to the other, being introduced through a hopper, D, and going out at an opening, $e$, which connects with a spout, S.

Beneath the said cylinder two inclines, F, slope toward the centre, leaving a narrow space between, as shown.

As the grain, or wheat is introduced into the machine, the cylinder is set in motion, revolving in the direction indicated by the arrow, the brush revolving in the opposite direction.

By this arrangement, as the grain passes along down the trough between the cylinder and the incline F, the wheat is kept in contact with the cylinder; while part of the cockle and other small seeds drop between the cylinder and the incline F, and passes out beneath the machine.

Such of the cockle as does not pass through the interstice last mentioned, between the said cylinder and incline, enters the cells $c$, and is carried over and discharged on the opposite side of the cylinder, passing out at the opening between the inclines F F, beneath the machine.

The wheat-kernels, if any should get into the cells, project therefrom, so that, upon reaching the brush B, they are brushed and thrown back, and effectually prevented from passing over with the cylinder, and thus all the cockle and small seeds are separated from the wheat, which passes out at the spout S, as aforesaid.

I am aware that the several devices herein shown and described, when taken separately, are of themselves not new. This machine is intended as an improvement upon the patent of T. H. McCulloch, for a separator, of 1868.

What I claim, is—

The arrangement of the cylinder C, with cells $e$, as herein set forth, brush B, inclines F, and spout D, all as herein specified.

G. H. RICH.

Witnesses:
WM. H. HOWELL,
W. E. MARRS.